United States Patent Office 3,729,554
Patented Apr. 24, 1973

3,729,554
METHOD OF TREATING HEMOLYTIC STREPTO-COCCI AND THE RESULTANT PREPARATION CONTAINING THE SAME
Shigeo Suzuki, Takao Noto, and Yoshio Takagaki, Tokyo, Sakae Wada, Ageo, and Akihiro Yamamoto, Haruki Ogawa, Takashi Matsuno, Hiroshi Okazaki, and Yutaka Sugawara, Tokyo, Japan, assignors to Chugai Seiyaku Kabushiki Kaisha, Tokyo, Japan
No Drawing. Continuation-in-part of application Ser. No. 694,854, Jan. 2, 1968. This application Mar. 15, 1971, Ser. No. 124,445
Claims priority, application Japan, Jan. 20, 1967, 42/3,651; Sept. 18, 1967, 42/59,387
Int. Cl. C12k 3/00
U.S. Cl. 424—93                                              9 Claims

ABSTRACT OF THE DISCLOSURE

By adding cephalosporin C or cycloserine to a living cell suspension of hemolytic streptococci having anti-tumor activity in a suspension medium to treat the cells with the antibiotic, it is possible to eliminate toxicity with increasing anti-tumor activity to make them useful anti-tumor preparations.

CROSS-REFERENCE TO RELATED APPLICATION

This is a continuation-in-part application of parent co-pending application Ser. No. 694,854, filed on Jan. 2, 1968, now abandoned in favor of the present application.

This invention relates to a method of increasing the anti-tumor activity and reducing toxicity, and also reducing virulence (i.e., pathogenicity) where it exists, of *Streptococcus hemolyticus*; and to preparations obtained thereby.

It is already known that certain living cells of *Streptococcus hemolyticus* have anti-tumor activity. However, it is extremely dangerous to use living cells in the amount required for treating a tumor, since this bacterium is quite toxic and is also a pathogen of erysipelas, etc. It has been reported recently that anti-tumor activity increases when cells of *Streptococcus hemolyticus* having anti-tumor activity are incubated at about 37° C. for a short time in a medium containing penicillin of a comparative high concentration ("Gann" vol. 55, pp. 233–236, 1964). It has been also known that toxicity is decreased and anti-tumor activity further increased when the suspension incubated about at 37° C., above-mentioned, is further subjected to heat treatment at about 45° C. for a short time (The Japanese Journal of Experimental Medicine, vol. 36, pp. 161–174, 1966).

While such a treatment using penicillin can increase anti-tumor activity of *Streptococcus hemolyticus* and decrease toxicity thereof, the preparation obtained by this method cannot be administered to patients who are susceptible to anaphylactic shock by penicillin. This is an important problem because of recent increases in the numbers of persons sensitive to penicillin as a result of its wide scale use in treatment of various kinds of diseases. Furthermore, because penicillin and protein are easily combined under alkaline conditions, penicillin protein complex causes a rise in the formation of antibodies leading to the development of allergies.

Investigations have therefore been carried out to find means of using *Streptococcus hemolyticus* in the treatment of tumors whereby such allergies, posing the danger of anaphylactic shock, do not occur and anti-tumor activity effectively increases. It has now been found that cephalosporin C and cycloserine can be used in place of penicillin because they increase the anti-tumor activity of the cells of *Streptococcus hemolyticus* better than penicillin, while the increase cannot be observed in streptomycin and many other antibiotics and chemotherapeutic agents. Further, toxicity and virulence, where it exists, are also reduced when the cell suspensions of *Streptococcus hemolyticus* with cephalosporin C or cycloserine incubated at about 37° C. is further subjected to heat treatment at about 45° C. for a short time.

According to the present invention, there is provided a new anti-tumor preparation and a new method for treating the cells of *Streptococcus hemolyticus* which comprises adding cephalosporin C or cycloserine to a cell suspension of *Streptococcus hemolyticus* in a suspension medium to make the concentration greater than $3 \times 10^{-2}$ moles/ml. and incubating the mixture at 30–38° C. and then preferably treating it at 38–50° C.

Illustrative strains of *Streptococcus hemolyticus* which may be used in this invention are:

*Streptococcus hemolyticus* Su (ATCC 21060)
*Streptococcus hemolyticus* Sv (ATCC 21059)
*Streptococcus hemolyticus* C–203 S (ATCC 21546)
*Streptococcus hemolyticus* Blackmore (ATCC 21548)
*Streptococcus hemolyticus* (ATCC 12202)

These *Streptococcus hemolyticus* may be cultivated, for example, in a meat-infusion broth or a medium mainly consisting of yeast extract, and the cells recovered from the culture broth are suspended in a suspension medium, e.g. Bernheimer's Basal Medium (composition: 675 mg. of maltose, 6 ml. of 2% aqueous solution of potassium dihydrogen phosphate adjusted to pH 6.9–7.0 with sodium hydroxide, 12 ml. of 2% aqueous solution of magnesium sulfate heptahydrate, 66 ml. of distilled water; hereinafter referred to as BBM), distilled water, physiological saline solution, phosphate-buffered solution, phosphate buffered saline solution or any other well known suspension medium.

Cephalosporin C and cycloserine may be directly added to the cell suspension or alternatively, they may be previously dissolved in the suspension medium prior to suspension of the bacterial cells. The concentration to be added in the cell suspension is preferably greater than $3 \times 10^{-2}$ moles/l. Cephalosporin C used for the present invention may be natural or synthetic, including, for example, cephalothin, cephaloridine, etc.

The cell suspension of *Streptococcus hemolyticus* containing cephalosporin C or cycloserine is incubated at 30–38° C., preferably about 37° C., for about 10–30 minutes, generally 20 minutes, to increase anti-tumor activity of the cells, and the incubated suspension is preferably further subjected to heat treatment at a temperature of more than 38° C. but less than 50° C. to decrease toxicity of the cells.

The thus obtained cell suspension of *Streptococcus hemolyticus* is suitable as an anti-tumor preparation, as it is, or it is variously diluted with physiological saline solution etc. on actual application in the treatment of tumors.

The anti-tumor preparation of the present invention is better in anti-tumor activity than that obtained using penicillin and it is further better because of no fear of anaphylactic shock; it is suitable for long-term continuous administration to patients who are hypersensitive to penicillin. Further, the anti-tumor preparation has very low toxicity, and the streptolysin S forming ability of the cells is completely lost particularly when cephalosporin C is used.

Examples and experimental examples of the present invention are offered illustratively.

EXAMPLE 1

Nine grams of yeast extract (produced by Ebios Yakuhin Kogyo K.K.) were dissolved in 200 ml. of distilled water, adjusted to pH 7.0–7.2 with 10% sodium hydroxide and heated at 100° C. for 60 minutes. After cooling, the precipitate formed was removed by filtration and the pH of the filtrate was readjusted with 10% sodium hydroxide. The solution was further heated at 100° C. for 30 minutes and filtered. Distilled water was added to the filtrate to bring it to 300 ml., and the resultant mixture was poured into sterilized flasks and subjected to steam sterilization at a pressure of 1 kg./cm.$^2$ for 10 minutes.

A culture broth of *Streptococcus hemolyticus* Su-strain, ATCC No. 21060 (nearly a virulent strain), obtained by cultivating the strain for 20 hours in 15 ml. of meat-infusion broth, was inoculated to 300 ml. of the above-mentioned yeast extract culture medium, and statically cultivated at 37° C. for 20 hours. The culture broth was subsequently chilled with ice and centrifuged to obtain cells. Such cells were then washed twice with physiological saline and suspended in 15 ml. of BBM. Absorbance of this cell suspension at 660 m$\mu$ was 7.80.

To 5 ml. of the thus obtained suspension, 1 ml. of 0.258 M cephaloridine-physiological saline solution was added and the suspension was incubated at 37° C. for 20 minutes. The streptococcal suspension thus obtained was subjected to anti-tumor test. The results are shown in Experimental Example 1 and Table 1 below.

EXAMPLE 2

Example 1 was repeated and the anti-tumor suspension obtained was further heated at 45° C. for 30 minutes. The suspension thus treated showed increased anti-tumor activity over that obtained in Example 1 comparing Experimental Examples 1 and 2. Toxicity was decreased.

EXAMPLE 3

Thirty grams of yeast extract (produced by Ebios Yakuhin Kyogo K.K.) were dissolved in 50 ml. of distilled water, adjusted to pH 7.0–7.2 with 10% sodium hydroxide, and heated at 100° C. for 60 minutes. After cooling, the precipitate formed was removed by filtration, the pH of the filtrate was readjusted with 10% sodium hydroxide solution, and distilled water was added to bring the total volume to 1000 ml. The solution was poured into sterilized flasks and subjected to steam sterilization at a pressure of 1 kg./cm.$^2$ for 10 minutes. A culture broth of *Streptococcus hemolyticus* Su-strain ATCC No. 21060 previously cultivated for 20 hours in 50 ml. of a meat-infusion broth was inoculated in 1000 ml. of the above-mentioned yeast extract medium, and statically cultivated at 37° C. for 14 hours. The culture broth was subsequently chilled with ice, centrifuged to obtain cells and the thus obtained cells were washed twice with cold physiological saline, and then suspended in 50 ml. of BBM. Absorbance of this cell suspension at 660 m$\mu$ was 9.7.

To 5 ml. of the suspension, 1 ml. of 0.258 M cycloserine physiological saline solution was added, and the resultant mixture was incubated at 37° C. for 20 minutes to increase the anti-tumor activity of the cells. Toxicity was decreased. See Tables 3 and 4 for experimental results.

EXAMPLE 4

Example 3 was repeated and the anti-tumor suspension obtained was further heated at 45° C. for 30 minutes. Toxicity was decreased. The anti-tumor activity of the cell suspension was increased over that obtained in Example 3.

EXAMPLE 5

*Streptococcus hemolyticus* Sv-strain ATCC No. 21059 (highly virulent) was cultivated and suspended into BBM following the same procedure as in Example 1. The absorbance of the bacterial cell suspension at 660 m$\mu$ was 7.90.

To 5 ml. of the thus obtained suspension, 1 ml. of 0.258 M cephaloridine-physiological saline was added and the suspension was incubated at 37° C. for 20 minutes as in Example 1, and further heated at 45° C. for 30 minutes as in Example 2. Virulence and toxicity were decreased, and anti-tumor activity increased. See Table 5 for experimental results.

EXAMPLE 6

*Streptococcus hemolyticus* C–203 S strain ATCC No. 21546 was cultivated and suspended in BBM following the same procedure as in Example 1. The absorbance of the bacterial cell suspension at 660 m$\mu$ was 5.00.

To 5 ml. of the thus obtained suspension, 1 ml. of 0.258 M cephaloridine-physiological saline solution was added and the suspension was incubated at 37° C. for 20 minutes as in Example 1, and further heated at 45° C. for 30 minutes as in Example 2. Toxicity was decreased, and anti-tumor activity increased. See Table 6 for experimental results.

EXAMPLE 7

*Streptococcus hemolyticus* Blackmore strain ATCC No. 21548 was cultivated and suspended in BBM following the same procedure as in Example 1. The absorbance of the bacterial cell suspension at 660 m$\mu$ was 8.60.

To 5 ml. of the thus obtained suspension, 1 ml. of 0.258 M cephaloridine-physiological saline solution was added and the suspension was incubated at 37° C. for 20 minutes as in Example 1, and further heated at 45° C. for 30 minutes as in Example 2. Toxicity was decreased and anti-tumor activity increased. See Table 7 for experimental results.

EXAMPLE 8

*Streptococcus hemolyticus* ATCC No. 12202 was cultivated and suspended in BBM following the same procedure as in Example 1. The absorbance of the bacterial cell suspension at 660 m$\mu$ was 4.50.

To 5 ml. of the thus obtained suspension, 1 ml. of 0.258 M cephaloridine-physiological saline solution was added and the suspension was incubated at 37° C. for 20 minutes as in Example 1, and further heated at 45° C. for 30 minutes as in Example 2. Toxicity was decreased and anti-tumor activity increased. See Table 8 for experimental results.

EXAMPLE 9

*Streptococcus hemolyticus* Sv-strain ATCC No. 21059 was cultivated and suspended in BBM following the same procedure as in Example 1. The absorbance of the bacterial cell suspension at 660 m$\mu$ was 7.9.

To 5 ml. of the thus obtained suspension, 1 ml. of 0.258 M cycloserine-physiological saline solution was added and the suspension was incubated at 37° C. for 20 minutes as in Example 3, and further heated at 45° C. for 30 minutes as in Example 4. Toxicity and virulence were decreased, and anti-tumor activity was increased. See Table 5 for experimental results.

EXAMPLE 10

*Streptococcus hemolyticus* C–203 S strain ATCC No. 21546 was cultivated and suspended in BBM following the same procedure as in Example 1. The absorbance of the bacterial cell suspension at 660 m$\mu$ was 5.00.

To 5 ml. of the thus obtained suspension, 1 ml. of 0.258 M cycloserine-physiological saline solution was added and the suspension was incubated at 37° C. for 20 minutes as in Example 3, and further heated at 45° C. for 30 minutes as in Example 4. Toxicity was decreased and anti-tumor activity increased. See Table 6 for experimental results.

EXAMPLE 11

*Streptococcus hemolyticus* Blackmore strain ATCC No. 21548 was cultivated and suspended in BBM following the same procedures as in Example 1. The absorbance of the bacterial cell suspension at 660 m$\mu$ was 8.60.

To 5 ml. of the thus obtained suspension, 1 ml. of 0.258 M cycloserine-physiological saline solution was added and the suspension was incubated at 37° C. for 20 minutes as in Example 3, and further heated at 45° C. for 30 minutes as in Example 4. Toxicity was decreased and anti-tumor activity increased. See Table 7 for experimental results.

EXAMPLE 12

*Streptococcus hemolyticus* ATCC No. 12202 was cultivated and suspended in BBM following the same procedure as in Example 1. The absorbance of the bacterial cell suspension at 660 mμ was 4.50.

To 5 ml. of the thus obtained suspension, 1 ml. of 0.258 M cycloserine-physiological saline solution was added and the suspension was incubated at 37° C. for 20 minutes as in Example 3, and further heated at 45° C. for 30 minutes as in Example 4. Toxicity was decreased and anti-tumor activity increased. See Table 8 for experimental results.

EXPERIMENTAL EXAMPLE 1
(ANTI-TUMOR TEST)

The streptococcal suspension obtained in Example 1 was diluted 10 fold, 20 fold, 30 fold and 40 fold with BBM containing 0.043 mole/l. of cephaloridine.

Mouse ascites were collected on the 8th day after inoculation of Ehrlich ascites carcinoma cells; cold physiological saline was then added after chilling the mouse ascites with ice and they were centrifuged for 5 minutes at 800–1000 r.p.m. Carcinoma cells sedimented were then washed twice with cold physiological saline water and suspended in BBM so that number of cells counted $6 \times 10^7$ per ml. Each 1 ml. of this carcinoma cell suspension was mixed with each 3 ml. of the above-mentioned suspensions incubated at 37° C. for 90 minutes, and 0.5 ml. of each the mixed solution was subsequently intraperitoneally injected into mice (ddY strain, average body weight: about 20 g.), each group consisting of 5 mice. Survival number of each group was observed. The results are shown in Table 1.

Comparative tests were simultaneously run with the streptococcal suspension similarly treated with (II) penicillin G potassium, (III) dihydrostreptomycin sulfate, (IV) streptococcal suspension untreated with antibiotics and (V) a BBM free from the streptococcal cells but containing the carcinoma cells.

TABLE 1

| Group | Drug added | Conc. of each drug in physiological saline aq. solution | Dilution numbers | Survival of mice after— 10 days | 20 days | 30 days | 50 days |
|---|---|---|---|---|---|---|---|
| I | Cephaloridine | 108 mg. (potency)/ml. (0.258 M) | ×10 | 5/5 | 5/5 | 5/5 | 5/5 |
|  |  |  | ×20 | 5/5 | 5/5 | 5/5 | 5/5 |
|  |  |  | ×30 | 5/5 | 4/5 | 4/5 | 3/5 |
|  |  |  | ×40 | 5/5 | 4/5 | 2/5 | 2/5 |
| II | Penicillin G potassium | $1.6 \times 10^5$ units/ml. (0.258 M) | ×10 | 5/5 | 5/5 | 5/5 | 5/5 |
|  |  |  | ×20 | 5/5 | 4/5 | 2/5 | 2/5 |
|  |  |  | ×30 | 5/5 | 4/5 | 1/5 | 1/5 |
|  |  |  | ×40 | 5/5 | 3/5 | 1/5 | 0/5 |
| III | Dihydrostreptomycin sulfate | 188 mg. (potency)/ml. (0.258 M) | ×10 | 5/5 | 1/5 | 0/5 | 0/5 |
|  |  |  | ×20 | 5/5 | 2/5 | 0/5 | 0/5 |
|  |  |  | ×30 | 5/5 | 2/5 | 0/5 | 0/5 |
| IV | None; Physiological saline only |  | ×10 | 5/5 | 3/5 | 1/5 | 1/5 |
|  |  |  | ×20 | 5/5 | 2/5 | 1/5 | 0/5 |
|  |  |  | ×30 | 5/5 | 2/5 | 0/5 | 0/5 |
| V | Control (not containing streptococcal cells; BBM only) |  |  | 5/5 | 0/5 | 0/5 | 0/5 |

Note.—Concentration of each drug in physiological saline water was adjusted so that it became an equi-molar concentration with Penicillin G potassium $1.6 \times 10^5$ units/ml. The calculation was performed by presuming Penicillin G potassium 1 mg. = 1367 units, and $1.6 \times 10^5$ units/ml. = 0.258 M. Moreover, the concentration of dihydrostreptomycin was calculated on the basis that 3 moles of sulphite were present for 2 moles of the dihydrostreptomycin base.

EXPERIMENTAL EXAMPLE 2
(ANTI-TUMOR TEST)

The streptococcal suspension obtained in Example 2 was diluted 20 fold, 40 fold, 60 fold and 80 fold with BBM containing 0.043 mole/ml. of cephaloridine.

Anti-tumor test was carried out following the procedure as used in Experimental Example 1, except using 8 mice for each group.

Comparative tests were simultaneously run with the streptococcal suspension similarly treated with (II) penicillin G potassium and (III) a BBM free from the streptococcal cells but containing the carcinoma cells.

The results are shown in Table 2.

TABLE 2

| Group | Drug added | Conc. of each drug in physiological saline solution | Dilution numbers | Survival of mice after— 10 days | 20 days | 30 days | 50 days |
|---|---|---|---|---|---|---|---|
| I | Cephaloridine | 108 mg. (potency)/ml. (0.258 M) | ×20 | 8/8 | 8/8 | 8/8 | 8/8 |
|  |  |  | ×40 | 8/8 | 8/8 | 8/8 | 8/8 |
|  |  |  | ×60 | 8/8 | 8/8 | 7/8 | 7/8 |
|  |  |  | ×80 | 8/8 | 7/8 | 5/8 | 5/8 |
| II | Penicillin G potassium | $1.6 \times 10^5$ units/ml. (0.258 M) | ×20 | 8/8 | 8/8 | 8/8 | 8/8 |
|  |  |  | ×40 | 8/8 | 8/8 | 6/8 | 6/8 |
|  |  |  | ×60 | 8/8 | 4/8 | 2/8 | 2/8 |
|  |  |  | ×80 | 8/8 | 3/8 | 1/8 | 1/8 |
| III | Control (not containing streptococcal cells; BBM only) |  |  | 8/8 | 0/8 | 0/8 | 0/8 |

EXPERIMENTAL EXAMPLE 3

(A) Sample preparation

*Streptococcus hemolyticus* Su-strain ATCC 21060 was cultivated by the procedure shown in Example 3 and bacterial cells were suspended in BBM.

1 ml. of physiological saline solution of cycloserine, penicillin G potassium or dihydrostreptomycin sulfate was added to 5 ml. of this cell suspension, and then incubated at 37° C. for 20 minutes. The resulting suspension was further heated at 45° C. for 30 minutes as in Example 4, and diluted with BBM to 2 fold, 4 fold and 8 fold and immediately used in the anti-tumor experiment.

(B) Anti-tumor experiment

To ddY strain male mice (average body weight about 20 g.), to which Ehrlich ascites carcinoma cells (Mouse ascites on 8th day after inoculation) had been intraperitoneally inoculated in a quantity of $10^6$ cells per mouse, the above-mentioned BBM diluted suspension were intraperitoneally injected 0.1 ml. per mouse, initiated 24 hrs. after the inoculation, once a day for a period of 5 days. Eight mice per group were used and survival number of each group was observed. The results are shown in Table 3.

TABLE 3

| Group | Drug added | Conc. of each drug in physiological saline solution | Dilution numbers | Survival of mice after— 10 days | 20 days | 30 days | 50 days |
|---|---|---|---|---|---|---|---|
| I | Cycloserine | 26.4 mg. (potency)/ml. (0.258 M) | ×4 | 8/8 | 8/8 | 8/8 | 8/8 |
|   |             |                                 | ×8 | 8/8 | 7/8 | 5/8 | 8/5 |
| II | Penicillin G potassium | 1.6×10⁵ units/ml. (0.258 M) | ×4 | 8/8 | 7/8 | 6/8 | 6/8 |
|    |                        |                              | ×8 | 8/8 | 3/8 | 2/8 | 2/8 |
| III | Dihydrostreptomycin sulfate | 188 mg. (potency)/ml. (0.258 M) | ×4 | 8/8 | 2/8 | 0/8 | 0/8 |
|     |                             |                                  | ×8 | 8/8 | 2/8 | 0/8 | 0/8 |
| IV | Control (not containing streptococcal cells; BBM only) | | | 8/8 | 0/8 | 0/8 | 0/8 |

EXPERIMENTAL EXAMPLE 4

Anti-tumor test was repeated in the same manner as in Experimental Example 3, except that the concentration of cycloserine and penicillin G potassium are adjusted 26.4 mg./ml. and 4.4×10⁴ units/ml. which is equivalent concentration therewith, respectively.

The results are shown in Table 4.

TABLE 4

| Group | Drug added | Conc. of each drug in physiological saline solution | Dilution numbers | Survival of mice after— 10 days | 20 days | 30 days | 50 days |
|---|---|---|---|---|---|---|---|
| I | Cycloserine | 26.4 mg. (potency)/ml. (0.258 M) | ×4 | 8/8 | 8/8 | 8/8 | 8/8 |
|   |             |                                  | ×8 | 8/8 | 7/8 | 5/8 | 5/8 |
| II | Penicillin G potassium | 4.4×10⁴ units/ml. (26.4 mg./ml.) | ×4 | 8/8 | 3/8 | 2/8 | 1/8 |
|    |                        |                                   | ×8 | 8/8 | 2/8 | 0/8 | 0/8 |
| III | Control (not containing streptococcal cells; BBM only) | | | 8/8 | 0/8 | 0/8 | 0/8 |

EXPERIMENTAL EXAMPLE 5
(ANTI-TUMOR TEST)

*Streptococcus hemolyticus* Sv-strain ATCC No. 21059 was cultivated by the procedure shown in Example 5, and the cells were suspended in BBM and treated with cephaloridine or cycloserine by the procedure of Example 5 or 9, respectively.

Anti-tumor tests were carried out by the method described in Experimental Example 3.

Comparative tests were simultaneously run with the streptococcal suspension similarly treated with penicillin G potassium.

The results of the tests are shown in Table 5.

TABLE 5

| Group | Drug added | Conc. of each drug in physiological saline solution | Dilution numbers | Survival of mice after— 10 days | 20 days | 30 days | 50 days |
|---|---|---|---|---|---|---|---|
| I | Cycloserine | 26.4 mg. (potency)/ml. (0.258M) | ×4 | 8/8 | 7/8 | 6/8 | 5/8 |
|   |             |                                  | ×8 | 8/8 | 6/8 | 5/8 | 3/8 |
| II | Cephaloridine | 108 mg. (potency)/ml. (0.258M) | ×4 | 8/8 | 8/8 | 8/8 | 7/8 |
|    |               |                                 | ×8 | 8/8 | 7/8 | 5/8 | 5/8 |
| III | Penicillin G potassium | 1.6×10⁵ units/ml. (0.258M) | ×4 | 8/8 | 7/8 | 6/8 | 5/8 |
|     |                        |                              | ×8 | 8/8 | 3/8 | 2/8 | 2/8 |
| IV | Control (not containing streptococcal cells BBM only) | | | 8/8 | 0/8 | 0/8 | 0/8 |

EXPERIMENTAL EXAMPLE 6
(ANTI-TUMOR TEST)

*Streptoocus hemolyticus* C-203 S strain ATCC No. 21546 was cultivated by the procedure shown in Example 6, and the cells were suspended in BBM and treated with cephaloridine or cycloserine by the procedure of Example 6 or 10, respectively.

Anti-tumor tests were carried out by the method described in Experimental Example 3.

Comparative tests were simultaneously run with the streptococal suspension similarly treated with penicillin G potassium.

The results of the tests are shown in Table 6.

TABLE 6

| Group | Drug added | Conc. of each drug in physiological saline solution | Dilution numbers | Survival of mice after— 10 days | 20 days | 30 days | 50 days |
|---|---|---|---|---|---|---|---|
| I | Cycloserine | 26.4 mg. (potency)/ml. (0.258 M) | ×4 | 8/8 | 6/8 | 4/8 | 4/8 |
|   |             |                                   | ×8 | 8/8 | 4/8 | 3/8 | 3/8 |
| II | Cephaloridine | 108 mg. (potency)/ml. (0.258 M) | ×4 | 8/8 | 7/8 | 5/8 | 5/8 |
|    |               |                                  | ×8 | 8/8 | 5/8 | 3/8 | 3/8 |
| III | Penicillin G potassium | 1.6×10⁵ units/ml. (0.258 M) | ×4 | 8/8 | 6/8 | 4/8 | 4/8 |
|     |                        |                               | ×8 | 8/8 | 4/8 | 3/8 | 2/8 |
| IV | Control (not containing streptococcal cells; BBM only) | | | 8/8 | 0/8 | 0/8 | 0/8 |

EXPERIMENTAL EXAMPLE 7
(ANTI-TUMOR TEST)

*Streptococcus hemolyticus* Blackmore strain ATCC No. 21548 was cultivated by the procedure shown in Example 7, and the cells were suspended in BBM and treated with cephaloridine or cycloserine by the procedure of Example 7 or 11, respectively.

Anti-tumor tests were carried out by the method described in Experimental Example 3.

Comparative tests were simultaneously run with the streptococcal suspension similarly treated with penicillin G potassium.

The results of the tests are shown in Table 7.

injected to each ddY mouse (average body weight about 20 g.) and the number of mice dying within 7 days was observed. The results obtained by using 10 mice for each group are shown in Table 10.

TABLE 7

| | | Streptococcal suspension | | Survival of mice after— | | | |
|---|---|---|---|---|---|---|---|
| Group | Drug added | Conc. of each drug in physiological saline solution | Dilution numbers | 10 days | 20 days | 30 days | 50 days |
| I | Cycloserine | 26.4 mg. (potency)/ml. (0.258 M) | ×4 | 8/8 | 6/8 | 6/8 | 5/8 |
| | | | ×8 | 8/8 | 5/8 | 4/8 | 3/8 |
| II | Cephaloridine | 108 mg. (potency)/ml. (0.258M) | ×4 | 8/8 | 7/8 | 6/8 | 6/8 |
| | | | ×8 | 8/8 | 6/8 | 4/8 | 4/8 |
| III | Pencillin G potassium | 1.6×10⁵/ml. units (0.258 M) | ×4 | 8/8 | 6/8 | 5/8 | 5/8 |
| | | | ×8 | 8/8 | 5/8 | 3/8 | 3/8 |
| IV | Control (not containing streptococcal cells; BBM only) | | | 8/8 | 0/8 | 0/8 | 0/8 |

EXPERIMENTAL EXAMPLE 8 (ANTI-TUMOR TEST)

*Streptococcus hemolyticus* ATCC No. 12202 was cultivated by the procedure shown in Example 8, and the cells were suspended in BBM and treated with cephaloridine or cycloserine by the procedure of Example 8 or 12, respectively.

Anti-tumor experiments were carried out by the method described in Experimental Example 3.

Comparative tests were simultaneously run with the streptococcal suspension similarly treated with penicillin G potassium.

The results of the tests are shown in Table 8.

Table 10

Treating drug: Number of dead mice
 Cycloserine _____ 0/10
 Penicillin G potassium _____ 0/10
 Without using drug _____ 8/10

EXPERIMENTAL EXAMPLE 11 (STREPTOLYSIN-S FORMING ABILITY TEST)

One ml. of sodium ribonucleate solution (concentration 8%) in BBM was added to 1 ml. of a treated cell suspension obtained in the same manner as that Experimental Example 9, incubated at 37° C. for 2 hours, and after centrifugation, hemolytic activity of the supernatant was

TABLE 8

| | | Streptococcal suspension | | Survival of mice after— | | | |
|---|---|---|---|---|---|---|---|
| Group | Drug added | Conc. of each drug in physiological saline solution | Dilution numbers | 10 days | 20 days | 30 days | 50 days |
| I | Cycloserine | 26.4 mg. (potency)/ml. (0.258 M) | ×4 | 8/8 | 5/8 | 5/8 | 4/8 |
| | | | ×8 | 8/8 | 4/8 | 3/8 | 3/8 |
| II | Cephaloridine | 108 mg. (potency)/ml. (0.258 M) | ×4 | 8/8 | 6/8 | 5/8 | 5/8 |
| | | | ×8 | 8/8 | 4/8 | 4/8 | 3/8 |
| III | Penicillin G potassium | 1.6×10⁵ units/ml. (0.258 M) | ×4 | 8/8 | 5/8 | 4/8 | 4/8 |
| | | | ×8 | 8/8 | 3/8 | 3/8 | 2/8 |
| IV | Control (not containing streptococcal cells; BBM only) | | | 8/8 | 0/8 | 0/8 | 0/8 |

EXPERIMENTAL EXAMPLE 9 (TOXICITY TEST)

Physiological saline solutions of cephaloridine or penicillin G potassium were added in a ratio of 0.2 ml. each to 1 ml. of a BBM suspension of cells of *Streptococcus hemolyticus* Su-strain ATCC No. 21060 obtained in the same manner as in Example 1 and incubated at 37° C. for 20 minutes, and then heated at 45° C. for 30 minutes.

0.1 ml. of this treated suspension was simultaneously injected on the back of each ddY mouse (average body weight about 20 g.) and the number of mice dying within 24 hours was observed.

The results obtained by using 10 mice for each group are shown in Table 9.

Table 9

Treating drug: Number of dead mice
 Cephaloridine _____ 0/10
 Penicillin G potassium _____ 0/10
 Without using drug _____ 8/10

EXPERIMENTAL EXAMPLE 10 (TOXICITY TEST)

0.2 ml. of a physiological saline solution of cycloserine or penicillin G potassium having the same concentrations as those used in Experimental Example 3 were added to 1 ml. samples of BBM cell suspension of *Streptococcus hemolyticus* Su strain ATCC No. 21060 obtained in the same manner as in Example 3 and heated at 37° C. for 20 minutes and subsequently heated at 45° C. for further 30 minutes. 0.1 ml. of this suspension was intraperitoneally determined by using rabbit erythrocytes according to the convention method.

The results of the tests are shown in Table 11.

Table 11

Streptolysin-S forming
ability—hemolysis
Treating drug: unit/ml.
 Cephaloridine _____ <1
 Penicillin G potassium _____ <1
 Without using drug _____ 2260

It will be obvious to those skilled in the art that various changes may be made without departing from the scope of the invention and the invention is not to be considered limited to what is described in the specification.

What is claimed is:

1. A method for treating the cells of *Streptococcus hemolyticus* to increase anti-tumor activity and decrease toxicity, which comprises: adding an antibiotic selected from the group consisting of cephalosporin C and cycloserine to a cell suspension of *Streptococcus hemolyticus* in a suspension medium to make the concentration of said antibiotic at least $3 \times 10^{-2}$ moles/l., incubating the mixture at 30–38° C. and further heating the mixture at a temperatuure of more than 38° C. but less than 50° C.

2. A method claimed in claim 1, in which *Streptococcus hemolyticus* is selected from the group consisting of *Streptococcus hemolyticus* Su-strain ATCC No. 21060; *Streptococcus hemolyticus* Sv–strain ATCC No. 21546; *Streptococcus hemolyticus* C–203 S ATCC No. 21546; *Strep-*

*tococcus hemolyticus* Blackmore ATCC No. 21548; and *Streptococcus hemolyticus* ATCC No. 12202.

3. A method claimed in claim 1, in which the first incubation period is 10–30 minutes and the further heating period is 20–60 minutes.

4. A method claimed in claim 1, in which the first incubation period is 20 minutes and the further heating period is 30 minutes.

5. A method claimed in claim 1, in which the suspension medium is Bernheimer's Basal Medium composed of 675 mg. of maltose, 6 ml. of 2% aqueous solution of potassium dihydrogen phosphate adjusted to pH 6.9–7.0 with sodium hydroxide, 12 ml. of 2% aqueous solution of magnesium sulfate heptahydrate and 66 ml. of distilled water.

6. A method claimed in claim 1, in which the suspension medium is phosphate buffered solution.

7. A method claimed in claim 1, in which the suspension medium is phosphate buffered saline solution.

8. A method claimed in claim 1, in which cephalosporin C is selected from the group consisting of natural cephalosporin C, cephalothin and cephaloridine.

9. The product produced according to the method of claim 1.

References Cited

Davis et al.: "Microbiology," pp. 314–5, 318–9 (1967).
Chemical Abstracts 65: 9379a (1966).
Okamoto et al.: "Japan J. Exp. Med." 36(2): 161–174 (1966).
Bailey et al.: "Diagnostic Microbiology," 2nd ed., p. 258–9 (1966).

ALVIN E. TANENHOLTZ, Primary Examiner

M. D. HENSLEY, Assistant Examiner

U.S. Cl. X.R.

195—96, 114